US007190976B2

(12) United States Patent
Enns et al.

(10) Patent No.: US 7,190,976 B2
(45) Date of Patent: Mar. 13, 2007

(54) CUSTOMIZING THE DISPLAY OF A MOBILE COMPUTING DEVICE

(75) Inventors: Neil Robin Newman Enns, Redmond, WA (US); Kevin A. Kennedy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 959 days.

(21) Appl. No.: 09/951,308

(22) Filed: Sep. 13, 2001

(65) Prior Publication Data

US 2002/0065110 A1 May 30, 2002

Related U.S. Application Data

(60) Provisional application No. 60/237,330, filed on Oct. 2, 2000.

(51) Int. Cl.
H04M 1/00 (2006.01)
(52) U.S. Cl. ........................................ 455/566; 715/517
(58) Field of Classification Search ................ 715/517, 715/700, 745–747, 760, 762; 455/414.1, 455/566
See application file for complete search history.

(56) References Cited

U.S. PATENT DOCUMENTS 6,509,913 B2 * 1/2003 Martin et al. ................ 715/762
6,785,667 B2 * 8/2004 Orbanes et al. ................ 707/1
2005/0210125 A1 * 9/2005 Li ................................ 709/219

FOREIGN PATENT DOCUMENTS

| DE | 19961192 A1 | 7/2000 |
| EP | 0949571 A2 | 4/1999 |
| EP | 0955779 A1 | 11/1999 |
| EP | 1128290 A2 | 2/2001 |

OTHER PUBLICATIONS

JBSA: An Infrastructure For Seamless Mobile Systems Integration Stefan Muller-Wilken and Winfried Lamersdorf Proc. 3rd IFIP/GI International Conference on Trends Towards a Universal Service Market (USM 2000) vol. 1890, Sep. 2000 13 pages.

* cited by examiner

Primary Examiner—Ovidio Escalante
(74) Attorney, Agent, or Firm—Workman Nydegger

(57) ABSTRACT

Efficiently displaying customized data on the display of a mobile computing device. Layout files, which are created, using an XML based language, receive data from data generating applications and format the received data to a user's specification. Multiple layout files may be included in a mobile computing device, allowing a user to select from a variety of display formats. Data generated by data generating applications is received and stored in an intermediate status store. Data consuming applications register with the status store indicating which portions of content they consume. When data changes and one or more data consuming applications have registered for the data, the status store notifies the registered data consuming applications so they may receive the data. Specialized data consuming applications called "plug-ins" may be include in layout files. A "plug-in manager" may control when plug-ins update a display device.

19 Claims, 10 Drawing Sheets

CUSTOMIZING THE DISPLAY OF A MOBILE COMPUTING DEVICE

CROSS-REFERENCE TO RELATED APPLICATIONS

The present application claims priority from U.S. provisional patent application Ser. No. 60/237,330, filed 2 Oct. 2000 and entitled "Flexible Display of Information on Mobile Devices", which provisional application is incorporated herein by reference in its entirety.

BACKGROUND OF THE INVENTION

1. The Field of the Invention

The present invention relates to customizing the display of data on mobile computing devices. More specifically, the present invention relates to systems, methods, and computer program products for defining a layout for displaying data on a mobile computing device, customizing the display of data on a mobile computing device based on user selections, and efficiently displaying data on a mobile computing device in a manner that conserves power resources.

2. Background and Relevant Art

Users of mobile computing devices, such as cellular phones, pagers, and personal digital assistants ("PDAs"), now have access to large quantities of data. For example, a substantial portion of World Wide Web data is viewable on mobile computing devices. In addition, mobile computing devices may display proprietary content, such as stock quotes, sports scores, and headline news. Users may also use mobile computing devices to store personal data, such as appointments, calendars, contact lists, instant messages, and electronic mail messages.

While the display area available for displaying data on mobile computing devices is quite limited as compared to standard monitors, the display area still continues to increase. Thus, users of mobile computing devices have the ability to view data from a variety of different sources simultaneously. While simultaneously displaying more and more data is beneficial to users, there are problems inherent in current technology that may prevent users from efficiently viewing desired data.

Many mobile computing devices are configured with a single display format. Still, not all users wish to view the same data. For instance, one user may wish to view continuous stock quotes and headline news, while a second user wishes to view sports scores and messages notifying them of the receipt of electronic mail. Furthermore, even the same user may wish to view different data at different times, perhaps viewing stock quotes at work and sports scores at home.

One attempt to solve this problem allowed programmers to develop additional code to change which data is displayed on the mobile computing device. However, using this approach to customize the look of a display requires technical expertise not normally possessed by the average user. Thus, the average user cannot typically develop a layout nor easily change the visual appearance of a display to suit their tastes.

Also, as a user increases the number of data sources from which they are acquiring data for display, the efficiency of the data acquisition decreases. The processor and memory resources of a mobile computing device are usually substantially less than that of a personal computer. Displaying data generated by different applications may involve each data consuming application performing a query in order to obtain all the needed data. For instance, a user may query an Internet Service Provider for electronic mail and instant messages, a first proprietary network for news and a second proprietary network for stock quotes. Querying multiple data generating applications places a burden on the processor of a mobile computing device, which slows processor operations and thus display of data.

An additional problem results when data generating applications do not send notification of updates. When data generating applications do not send notification, data consuming applications have no way to know when an update has occurred. As a result, data consuming applications may often query data that has not changed. It may also be that a mobile computing device caches displayed data for some amount of time after it is displayed. Caching display data and querying data when it has not changed consumes memory resources and results in the needless execution of processor instructions, and results in unnecessary power consumption.

Finally, current display technology may redraw the complete area of a display even though only a portion of the displayed data is updated. Redrawing portions of the display that have not been updated increases the number of pixels that must be refreshed. This results in the execution of processor instructions needed to refresh the pixels, which consumes power resources.

Therefore, what are desired are systems, methods, and computer program products for efficiently displaying user customizable data on the display of a mobile computing device in a manner that conserves the processing and battery resources of the mobile computing device.

BRIEF SUMMARY OF THE INVENTION

The principles of the present invention provide for efficiently displaying user customizable data on a mobile computing device. Data consuming applications in a mobile computing device, such as a cellular phone, register with a status store, indicating updates they wish to receive. When data in the status store is updated, notifications go out to registered data consuming applications. Notified applications then query the status store to retrieve the update.

Customization is facilitated using layout files that define the formatting and arrangement of data on the display of a mobile computing device. Layout files may be created using an XML-based markup language, which includes only a few basic elements. One of the elements included in the XML-based markup language is the "plugin" element. A plug-in may be included in a dynamic linked library ("DLL") that is written to function with a particular mobile computing device.

Plug-ins may be included in layout files and coded to perform a variety of operations such as retrieving data related to a cellular carrier name, a four-day weather forecast, sports scores, or any other desired data. After data is retrieved by a plug-in, the layout file may format the data in any number of ways. One way the layout file may format retrieved data is to set one or more attributes associated with the plug-in, which modify the properties of the data retrieved by the plug-in. For example, different layout files may use the same plug-in to retrieve a cellular carrier name, yet display the cellular carrier name in different locations on a display, in different text colors, or in different fonts.

Multiple layout files may be installed in a mobile computing device. A user may thus switch between different layout files. Since different layout files may include different plug-ins, a user may have access to a variety of data.

Additionally, since different layout files may set different attributes for the same data, different views of the same data may be displayed. Thus, average users may easily change the visual appearance of their display by merely selecting different layout files.

The status store is an intermediate repository, which stores data from data generating applications. These data generating applications may reside on the Internet or other proprietary networks, or may reside locally on the mobile computing device. As stated above, data consuming applications identify the data they need access to by registering with the status store. When an update occurs, notification is sent to registered data consuming applications. The notified data consuming applications then query the status store to retrieve the update. Since data consuming applications only query the status store, and then only when they receive notification, the overall number of queries is reduced. Additionally, there is a reduced chance of performing a query for data that has not changed. Performing fewer queries reduces the number of executed processor instructions, which in turn conserves power resources and increases efficiency in displaying data.

When the data consuming applications are plug-ins, a "plug-in manager" keeps track of the data updates for which each plug-in is registered. When data is updated in the status store, the plug-in manager is notified and receives the updated data. The plug-in manager runs through the list of plug-ins and causes the ones whose data is updated to redraw. During the redraw, the plug-in requests the updated data from the plug-in manager and displays the updated data. Thus, only those portions of the display that have an update are redrawn. This reduces the number of executed processor instructions and the number of pixels that must be refreshed on the display, both of which conserve power resources.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1A:
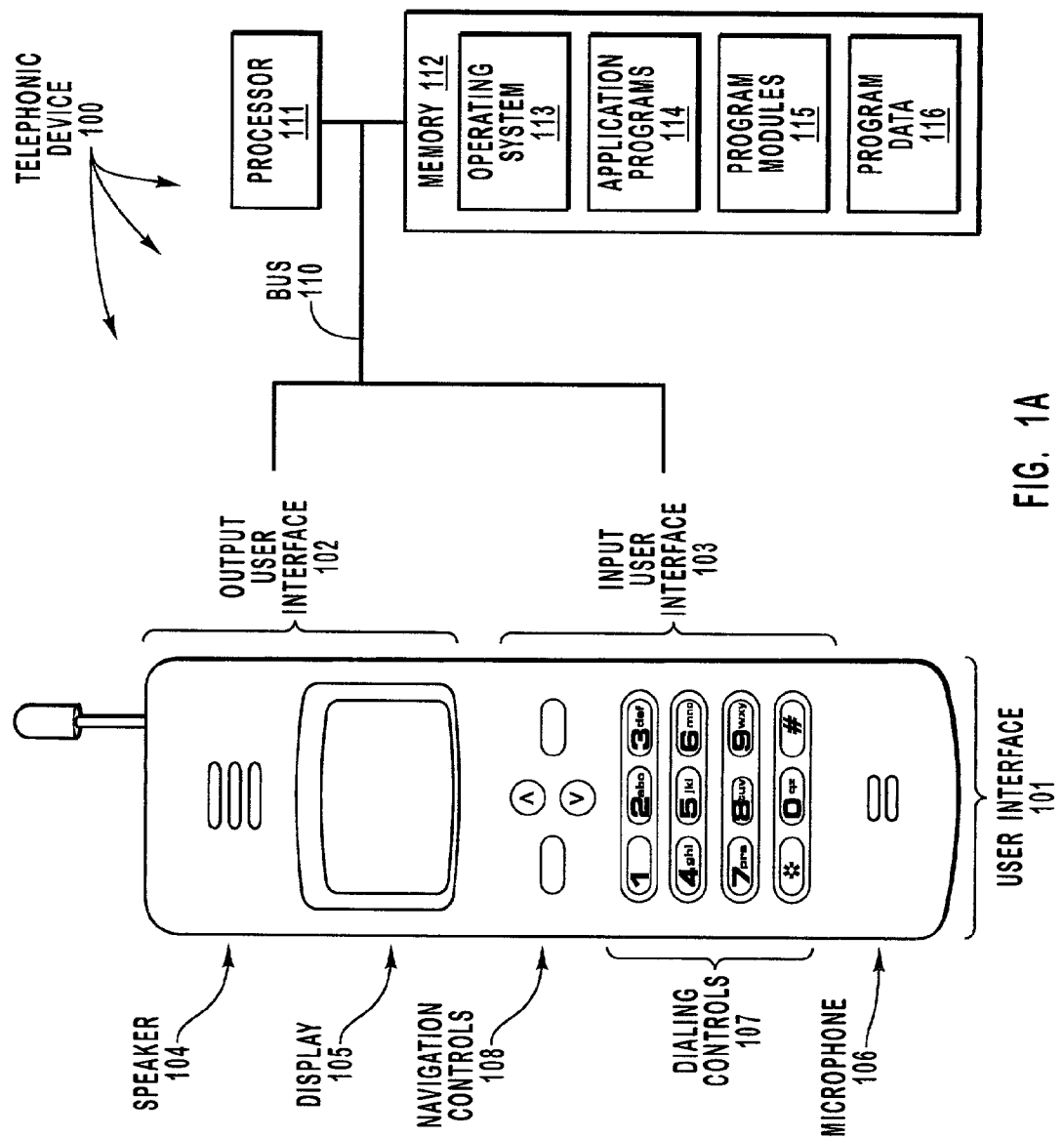
FIG. 1A illustrates an example mobile computing device that provides a suitable operating environment for the present invention.

The present invention extends to systems, methods, and computer program products for efficiently displaying customized data on the display of mobile computing devices in a manner that conserves power resources. Multiple layout files, which may be created using a programming language, such as the XML markup language or derivatives thereof, are installed on, or otherwise made accessible to, a mobile computing device. Each layout file may include one or more "plug-ins," which retrieve content from data generating applications. If content is retrieved by a plug-in, the associated layout file may format the content prior to the content being displayed. Different layout files may include plug-ins that retrieve different content. Furthermore, a layout file may format content from the same plug-in in a variety of different ways. This results in a large number of different display options, giving the user of a mobile computing device the ability to customize the data that is displayed.

During operation, a status store, which is an intermediate data repository, stores content for data consuming applications. Data generating applications send content to the status store instead of sending it directly to data consuming applications. To access updated content, plug-ins or other data consuming applications may register with the status store to indicate content they are interested in. When the status store detects a change in content that one or more data consuming applications are interested in, the status store sends notification to the data consuming applications. The data consuming applications may then query to retrieve updated content. The number of processor instructions executed when querying content is reduced, because instead of constantly polling for updated content, data consuming applications query for data after a notification is received. Since fewer processor instructions are executed, data may be displayed more efficiently and in a manner that conserves power resources.

Data consuming applications may register with the status store either directly or through an intermediate application. For instance, plug-ins may directly interface with a "plug-in manager," which in turn directly interfaces with the status store. In this instance, the plug-in manager would receive notification of updated content, initiate a redraw for only the portion of the display that has updated content, retrieve the updated content, and send the updated content to the requesting plug-in. Since only the portion of the display associated with the updated content is redrawn, as opposed to the whole display, the number of processor instructions that are executed and the number of pixels that must be refreshed are reduced. This results in more efficient display of content and conserves power resources.

The embodiments of the present invention may comprise a special purpose or general purpose computing device including various computer hardware, as discussed in greater detail below. Embodiments within the scope of the present invention also include computer-readable media for carrying or having computer-executable instructions or data structures stored thereon. Such computer-readable media may be any available media, which is accessible by a general purpose or special purpose computer. By way of example, and not limitation, such computer-readable media can comprise physical storage media such as RAM, ROM, EPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1A and the following discussion are intended to provide a brief, general description of a suitable computing environment in which the invention may be implemented. Although not required, the invention will be described in the general context of computer-executable instructions, such as program modules, being executed by computing devices. Generally, program modules include routines, programs, objects, components, data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where local and remote processing devices that are linked (either by hardwired links, wireless links, or by a combination of hardwired or wireless links) through a communications network perform tasks. In a distributed computing environment, program modules may be located in both local and remote memory storage devices.

With reference to FIG. 1A, a suitable operating environment for the principles of the invention includes a general-purpose computing device in the form of a telephonic device 100. The telephonic device 100 includes a user interface 101 for allowing a user to input information through an input user interface 103, and review information presented via an output user interface 102.

For example, the output user interface 102 includes a speaker 104 for presenting audio information to the user, as well as a display 105 for presenting visual information to the user. The telephonic device 100 may also have an antenna 109 if the telephonic device 100 has wireless capabilities.

The input user interface 103 may include a microphone 106 for rendering audio information into electronic form. In addition, the input user interface 103 includes dialing controls 107 represented by 12 buttons through which a user may enter information. Input user interface 103 also includes navigation control buttons 108 that assist the user in navigating through various entries and options listed on display 105.

Although the user interface 101 has the appearance of a mobile telephone, the unseen features of the user interface 101 may allow for complex and flexible general-purpose processing capabilities. For example, the telephonic device 100 also includes a processor 111 and a memory 112 that are connected to each other and to the user interface 101 via a bus 110. The memory 112 generically represents a wide variety of volatile and/or non-volatile memories that may be employed. The particular type of memory used in the telephonic device 100 is not important to the present invention.

Program code means comprising one or more program modules may be stored in memory 112. The one or more program modules may include an operating system 113, one or more application programs 114, other program modules 115, and program data 116.

While FIG. 1A represents a suitable operating environment for the present invention, the principles of the present invention may be employed in any device that is capable, with suitable modification if necessary, of implementing the principles of the present invention. The environment illustrated in FIG. 1A is illustrative only, and by no means represents even a small portion of the wide variety of environments in which the principles of the present invention may be implemented.

Figure 1B:
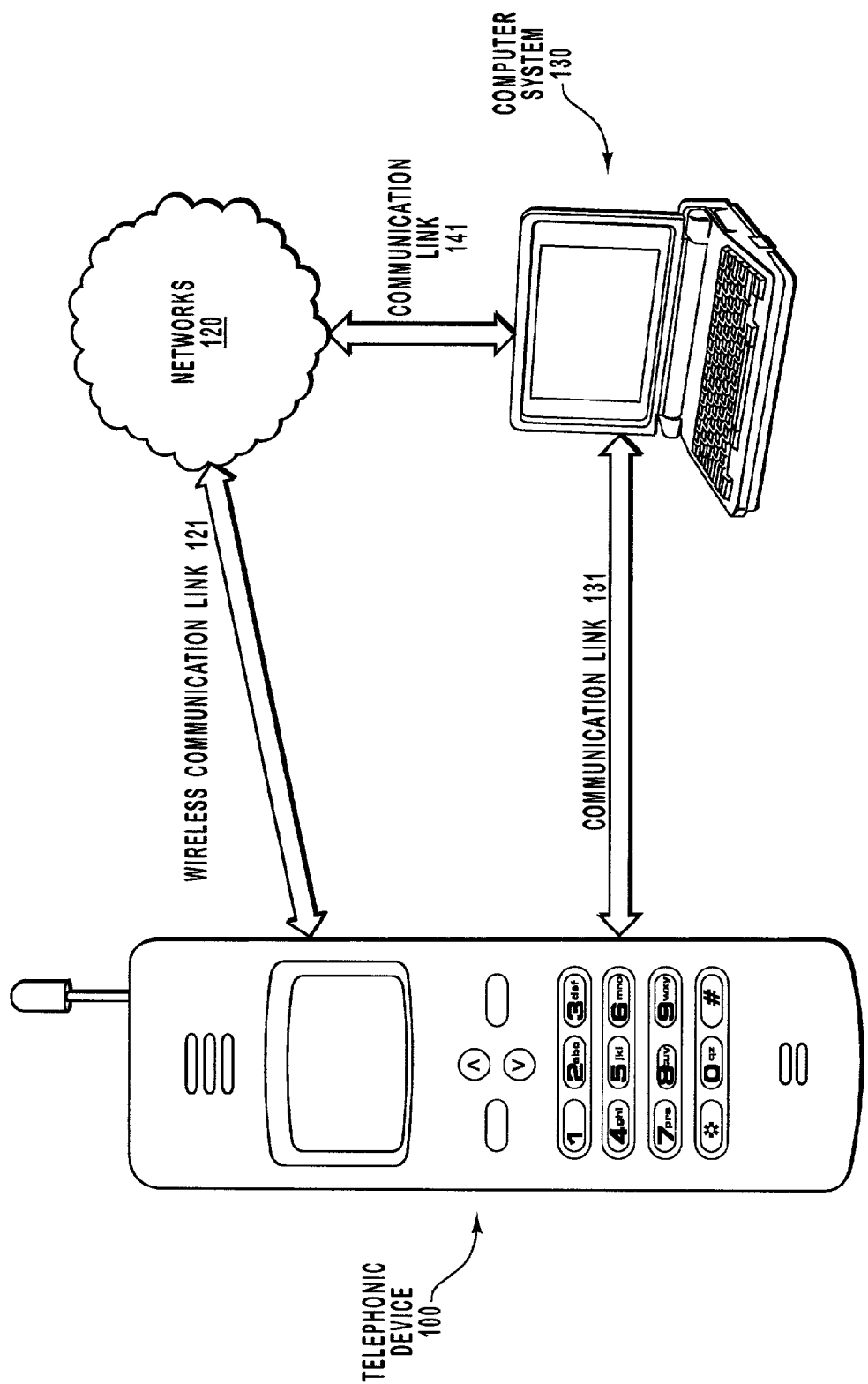
FIG. 1B illustrates an example network system that provides a suitable operating environment for the present invention.

FIG. 1B illustrates telephonic device 100 in communication with resources from which telephonic device 100 may receive content, such as a layout file or displayable data. Telephone device 100 may communicate with networks 120 over wireless communication link 121. Networks 120 may include the cellular or digital network used by telephonic device 100 for voice communications, the Internet, other proprietary networks that generate content, or any combination thereof. When communicating over wireless communication link 121, telephonic device 100 may receive content from data generating locations included on networks 120, such as applications running at a cellular or digital service provider, an Internet service provider, or other proprietary networks. The content received by telephonic device 100 may include layout files or displayable data, such as electronic messages, sports scores, news, or other content of interest to the user of telephonic device 100.

Telephonic device 100 may also communicate with computer system 130 over communication link 131. In this instance, computer system 130 may have previously downloaded content from network 120 over communication link 141. The downloaded content may be similar to that transferred directly to telephonic device 100 over wireless communication link 121. Computer system 130 may store downloaded content until communication is established with telephonic device 100 at which time the content is transferred to telephonic device 100. Communication links 131 and 141 may be wireless links, hardwired links, or combinations thereof.

FIG. 1B is merely illustrative of one embodiment in which the principles of the present invention may be practiced. Telephonic device 100 may be configured to receive content only from networks 120, only from computer system 130, or from both of these locations. Alternatively or in addition, the content may be internally generated by one of the application programs 114 executed locally on the telephonic device 100. Additionally, it may be the case that telephonic device 100 is configured to receive content from other locations, either singly, or in combination with networks 120, computer system 130, or both networks 120 and computer system 130.

One type of content that telephonic device 100 may receive is a layout file. A layout file is previously coded content that defines how other content received by telephonic device will be displayed on display 105. Layout files may be coded using a programming language, which when the instructions of the programming language included in a layout file are executed on telephonic device 100, either directly or after compiling, cause telephonic device 100 to display content as defined by the layout file.

One group of programming languages that may be used to create a layout file is known as "markup languages." Markup languages are intended to be independent of any hardware or software and may be defined for any area of application. Some of the objectives of markup languages are separating "content and structure," identifying text objects generically, and using a formal grammar to structure relationships between coded text objects. As such, generating programs for displaying and arranging text is often substantially easier when using a markup language.

Many commercially used markup languages are based on the Standard Generalized Markup Language ("SGML"). SGML is not a programming language, but a "meta-language" used to define structural markup languages. The Hyper Text Markup Language ("HTML") is an example of a markup language that was designed using SGML. A complete definition of SGML is contained in international standard ISO 8879 "Information Processing—Text and Office Systems—Standard Generalized Markup Language (SGML)."

Figure 7:
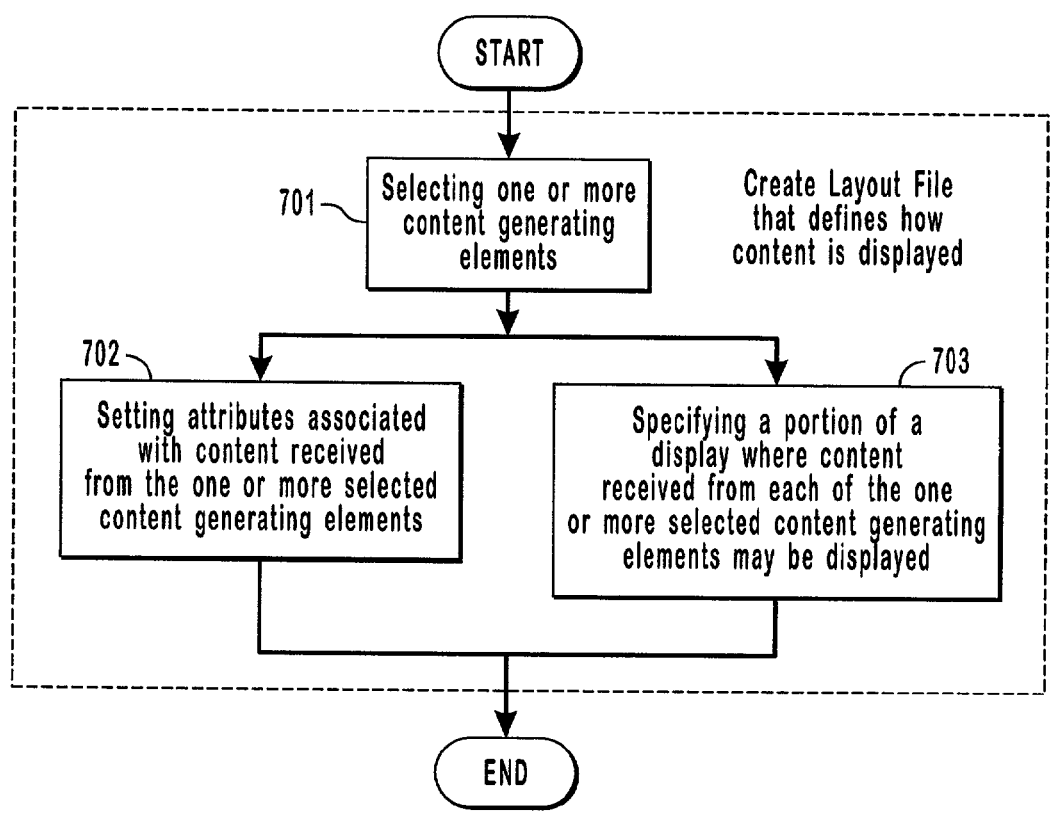
FIG. 7 is a flow chart illustrating a method for creating a layout file in accordance with the present invention.

The flow chart in FIG. 7 illustrates one method of creating a layout file. The method begins with the selection of one or more content generating elements (act 701). Markup languages typically use "tags," which are commands that specify how a document, or a portion of the document should be formatted. Extensible Markup Language ("XML") is a subset of SGML, designed specifically for interoperability with World Wide Web applications, which allows designers to create their own customized tags, thereby enabling definition, transmission, and interpretation of data between applications or computer systems XML. Thus, when using XML, a designer may create one or more customized tags that receive data associated with data generating applications.

The method in FIG. 7 then performs the acts of setting attributes associated with content received from the one or more selected content generating elements (act 702) and specifying a portion of a display where content received from each of the one or more selected content generating elements may be displayed (act 703). Tags may be associated with one or more attributes, which perform specific text manipulating operations on received data. Attributes may be included in a tag that receives data from a data generating application or in other tags included in a layout file. Specifying portions of the display where different data is displayed may be preconfigured based on the size of the display. However, specifying portions of a display may also include associating attributes with one or more tags included in a layout file. Thus, tags and associated attributes may be included in a layout file to format data before it is displayed. Additionally, it may be that customized tags are created only once and still able to interoperate between multiple heterogeneous mobile computing devices, of which telephonic device 100 is an example.

Figure 8:
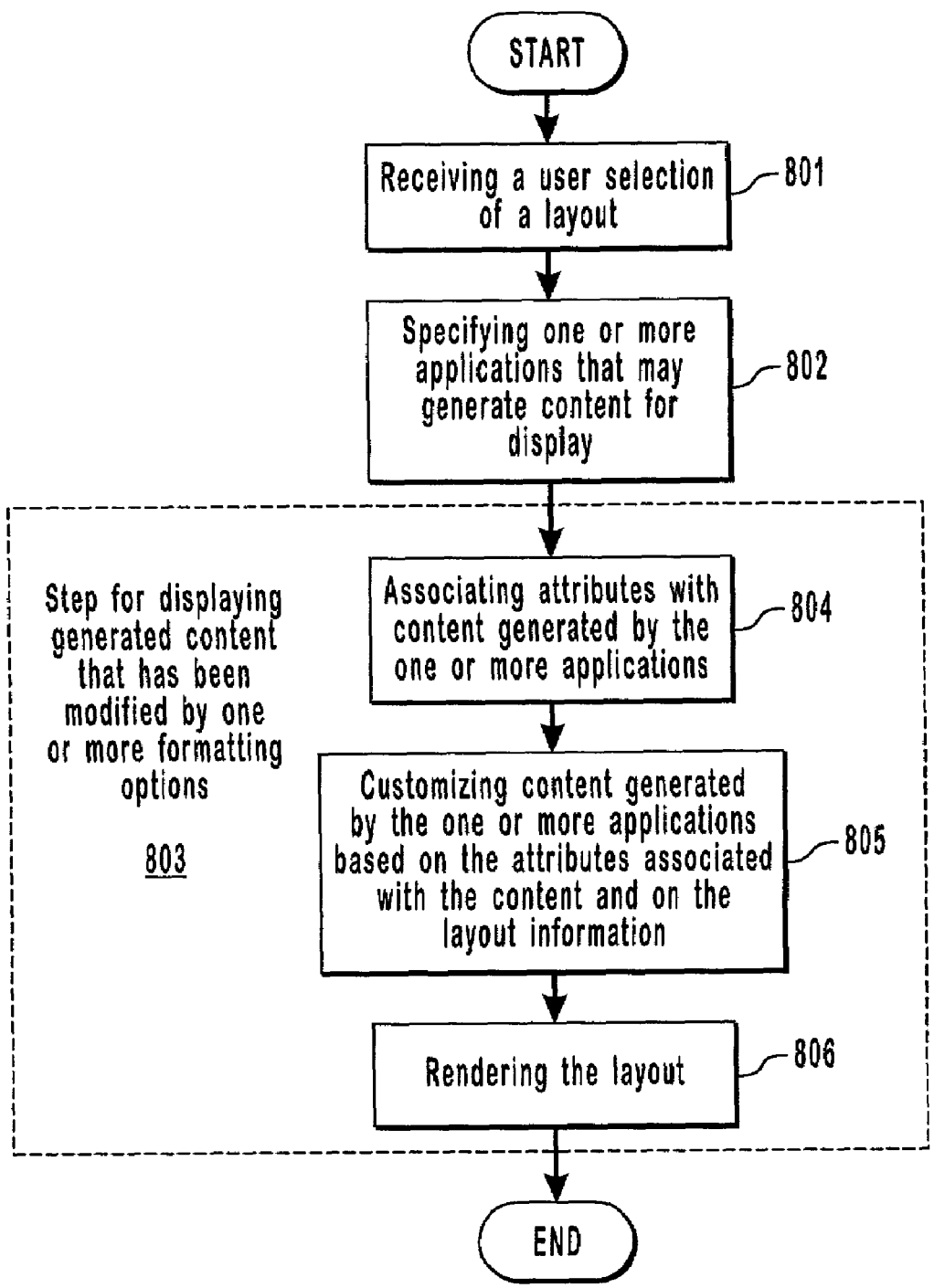
FIG. 8 is a flow chart illustrating a method for a user to customize the display of data in accordance with the present invention.

The flow chart in FIG. 8 illustrates one method for displaying a customized arrangement of content so as to allow a user to personalize displayed content for their specific needs. The method begins by receiving a user selection of a layout (act 801). This may involve selecting a layout from a plurality of layouts included in a device like telephonic device 100. A user of telephonic device 100 may manipulate the keys on input user interface 103 to select a desired layout. After selecting a layout, one or more applications that may generate content for display are specified (act. 802). Specifying the one or more content generating applications may involve telephonic device 100 processing tags included in the selected layout file. It may also be the case that a user of telephonic device 100 selects content generating applications by manipulating the keys on input user interface 103.

The method then performs a step for displaying generated content that has been modified by one or more formatting options (step 803). In one embodiment, this may include performing the acts of associating attributes with content generated by the one or more applications (act 804), customizing the content generated by the one or more applications based on the associated attributes and on the layout information (act 805), and rendering the layout (act 806).

Performing acts 804, 805, and 806 to display generated content will now be described in the context of XML based tags included in a layout file that, when executed, customize the display of content. The following description is illustrative only. It would be apparent to one skilled in the art, after having reviewed this description, that a wide variety of customized tags may be used to implement the principles of the present invention. In describing the layout file, XML based tags, which may be grouped together to perform a certain function or simply to make a layout file more readable, will be presented and discussed. These XML based tags when combined together would create one example of a layout file.

A layout file may begin with XML based tags that provide initialization information or that are required for the layout file to function as intended. For example, the following illustrates the initialization portion of an XML based layout file.

```
<?xml version="1.0" ?>
<home>
    <author>Sample Author</author>
    <contacturl>http://www.sampleauthor.com/</contacturl>
    <title>Leaves</title>
    <version>1.0</version>
    .
    .
    .
</home>
```

The initialization portion of the layout file may include XML based tags identifying the author of the layout file and a uniform resource locator used to access more information on the layout or contact the author. Text associated with an included "title" tag, in this case "Leaves," represents a name by which the layout file may be referenced. Text associated with the "title" tag may also be the text that is displayed to the user of telephonic device 100 on display 105, thereby enabling the user to verify the title of the current layout file. The layout file identified by the title "Leaves" will be referred to as the "Leaves file" throughout the rest of the description of the XML based tags. The initialization portion of the example layout file may also include version information, which may be used by other tags in the layout file or to denote the functionality of a layout file. In a networking environment that includes a plurality of computer systems each with different hardware and software, the known functionality of a layout file may be critical to interoperability between the computer systems.

A layout file may then include XML based tags that set default values for the display of data. However, more specific formatting tags may preempt the default values. The following illustrates an XML based tag that sets default values for a layout.

```
<?xml version="1.0" ?>
<home>
.
.
    <default font-face="nina" font-size="14"
    font-weight="bold" padding-left="4"
        padding-right="4" padding-top="2" bgcolor="transparent"
        fgcolor="#FFFFFF" b-border-color=
        "#FFFFFF" b-border-width="1">
      </default>
      <background bgimage="\bgfiles\leaves.jpg"
      valign="bottom" b-border-width="0" />
.
.
  </home>
```

In this instance, the "default" tag is associated with a plurality of attributes. The first three attributes: font-face, font-size, and font-weight are used to set the default display font. Thus, any data for which there is no other preempting font formatting instructions is displayed in bold 14 pt Nina font. The next three attributes: padding-left, padding-right, and padding-top, may be used to specify the distance in pixels between displayed text and the bounding rectangle around the displayed text. The next two included attributes are bgcolor and fgcolor, which set the background and foreground colors, respectively. The foreground color is the display color for text and the background color is displayed everywhere inside a rectangle bounding a portion of text that is not displaying text.

There are a number of color spaces well known in the art, including red, green, blue ("RGB") and cyan-magenta-yellow-black ("CMYK,") any of which may be used singly or in combination to implement the principles of the present invention. In this instance, the fgcolor attribute is set using the RGB color space. The RGB color space adds individual components from red, green, and blue to form a desired color. Each of the three primary additive colors may be represented by a hexadecimal value that ranges from 0 to FF. A 0 value represents none of the color component and FF represents the full value of the color component. The complete lack of color, for instance when all three components are set to 0, represents black. On the other hand, maximum values for all three components, in this case when all values are FF, represents no black, and may appear as the color white to the human eye. The first two hexadecimal digits may represent the individual component for red, the middle two digitals may represent the individual component for green, and the last two digits may represent the individual component for blue. When interpreted by the correct software and hardware, these individual colors are combined to generate a color.

As shown in the above portion of the Leaves file, fgcolor is set to a value of FFFFFF. As values for all three primary colors are set to a maximum, this may result in the color white. Shown in FIG. 2, all text within the area bounded by the leaves background is white in color.

Figure 2:
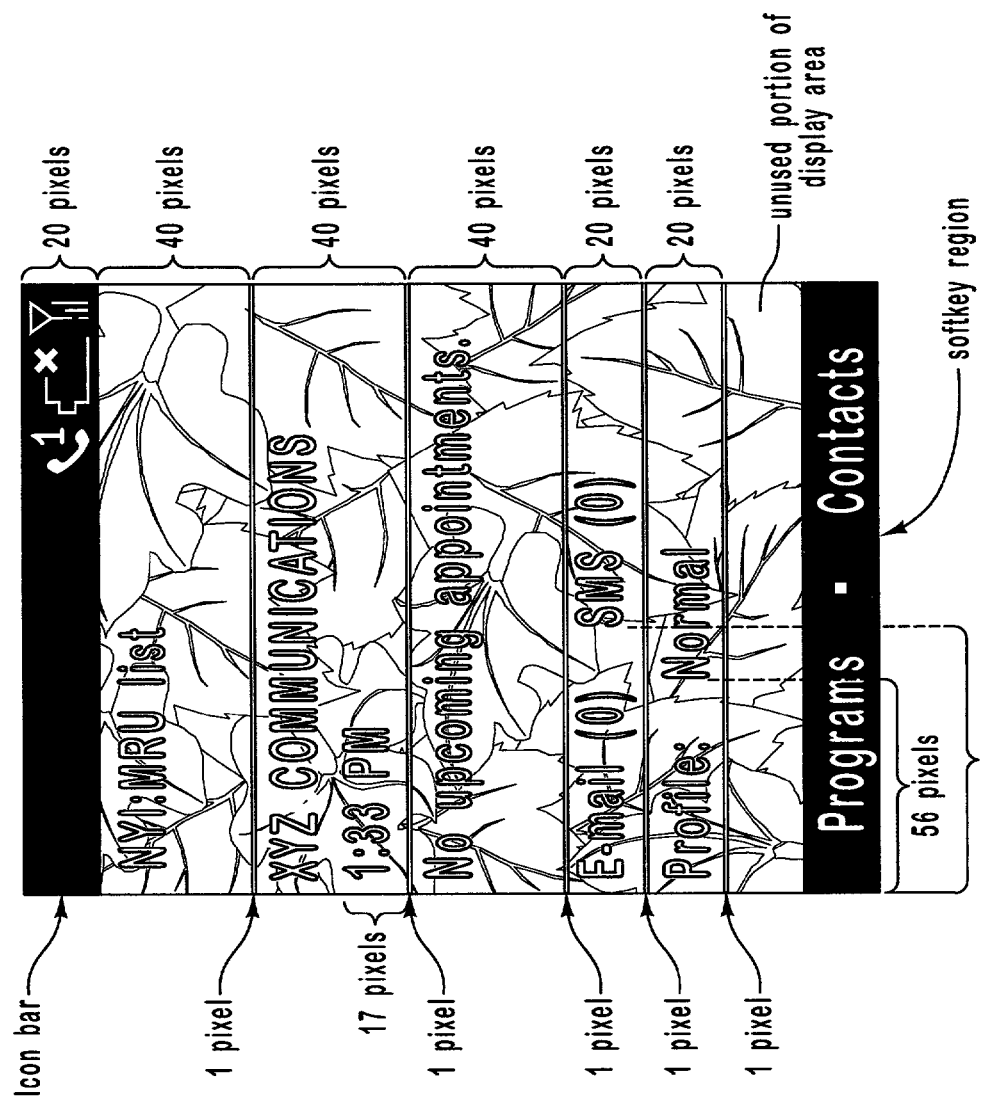
FIG. 2 illustrates a custom display that may be generated using the principles of the present invention.

Attributes included in the Leaves file may also take special values. Referring again to the "default" tag portion of the leaves file, bgcolor is set to "transparent." This value is not representative of a value included in a color space. It sets the background on which the text is displayed to transparent, so other data may be displayed in the background. In this case, the "background" tag provides the information displayed in the background. The attribute bgimage causes display of the file leaves.jpg, which is included in the directory bgfiles. As shown in FIG. 2, a portion of the displayable area includes leaves in the background.

Referring back to the "default" tag, the b-border-color attribute represents the color of the bottom border associated with displayed text. The b-border-color attribute is set to FFFFFF, representing white. The b-border-width attribute represents the width of the border in pixels and is set to 1. As shown in FIG. 2, there is a white border below each portion of displayed text that is 1 pixel in width. However, the "background" tag overrides the b-border-width setting it to 0. Thus, when the leavesjpg file is displayed, there is no white bottom border.

Next, a layout file may include a predefined color scheme. The Leaves file includes the following predefined color scheme.

```
<?xml version="1.0" ?>
<home>
.
.
    <scheme>
        <color name="COLOR_TRAYGRADLEFT"
        value="#00AD55" />
        <color name="COLOR_TRAYGRADRIGHT"
        value="#B3E9CF" />
        <color name="COLOR_HIGHLIGHT" value="#00A651" />
        <color name="COLOR_HIGHGRADLEFT"
        value="#00A651" />
        <color name="COLOR_HIGHGRADRIGHT"
        value="#00A651" />
        <color name="COLOR_GRADLEFT" value="#FEFFFE" />
        <color name="COLOR_GRADRIGHT" value="#92DCB7" />
        <color name="COLOR_INTGRADLEFT"
        value="#FEFFFE" />
        <color name="COLOR_INTGRADRIGHT"
        value="#CEEFDE" />
        <color name="COLOR_BTNFACE" value="#00AD55" />
        <color name="COLOR_SCROLLBAR" value="#00AD55" />
    </scheme>
.
.
  </home>
```

The "scheme" tag specifies the color and gradient scheme for an entire device. This allows a layout file developer to provide colors that match on all displays across the entire device. Table 1 shows a list of attributes for the "color" tag and what portions of a display screen they may effect. The list of attributes included in Table 1 is illustrative only, it would be apparent to one skilled in the art, after having reviewed this description that a wide variety of color and gradient attributes may used to implement the principles of the present invention. Color values are represented using the RGB color space.

TABLE 1

Attributes Associated with the Color Tag

| Name | Items affected |
|---|---|
| COLOR_WINDOW | Background color for all application windows and controls, including the transparent portions of scroll bar stripes |
| COLOR_WINDOWTEXT | Text color for list views, controls, and labels. Does not set menu text color, softkey color, or button text color |
| COLOR_STATIC | Background color for static controls, such as labels. Also sets the background color for message boxes |
| COLOR_STATICTEXT | Text color for static controls such as labels |
| COLOR_HIGHLIGHT | Color of selection for list views, controls, menus, and softkey buttons |
| COLOR_HIGHLIGHTTEXT | Color of text when an item has selection, such as a list view element or a control, and highlighted softkeys |
| COLOR_MENU | Background color for menus |
| COLOR_MENUTEXT | Text color for menu items |
| COLOR_GRAYTEXT | Color for disabled text, such as disabled menu items and softkey buttons |
| COLOR_GRADLEFT | Starting color value for the background gradient |
| COLOR_GRADRIGHT | Ending color value for the background gradient |
| COLOR_INTGRADLEFT | Starting color value for the secondary background gradient |
| COLOR_INTGRADRIGHT | Ending color value for the secondary background gradient |
| COLOR_HIGHGRADLEFT | Starting color value for the highlight gradient |
| COLOR_HIGHGRADRIGHT | Ending color value for the highlight gradient |
| COLOR_TRAYGRADLEFT | Starting color value for the title bar gradient |
| COLOR_TRAYGRADRIGHT | Ending color value for the title bar gradient |
| COLOR_TRAYTEXT | Color for the title bar text |
| COLOR_WINDOWFRAME | Color of the dividing line between the main window and the softkey region, and the bounding rectangle around the scroll bar thumb |
| COLOR_BTNFACE | Unselected background color for the softkey region |
| COLOR_BTNTEXT | Unselected text color for the softkey region, navigation glyph and scroll bar thumb |
| COLOR_SCROLLBAR | Color of the stripes on the scroll bar |

Figure 3:
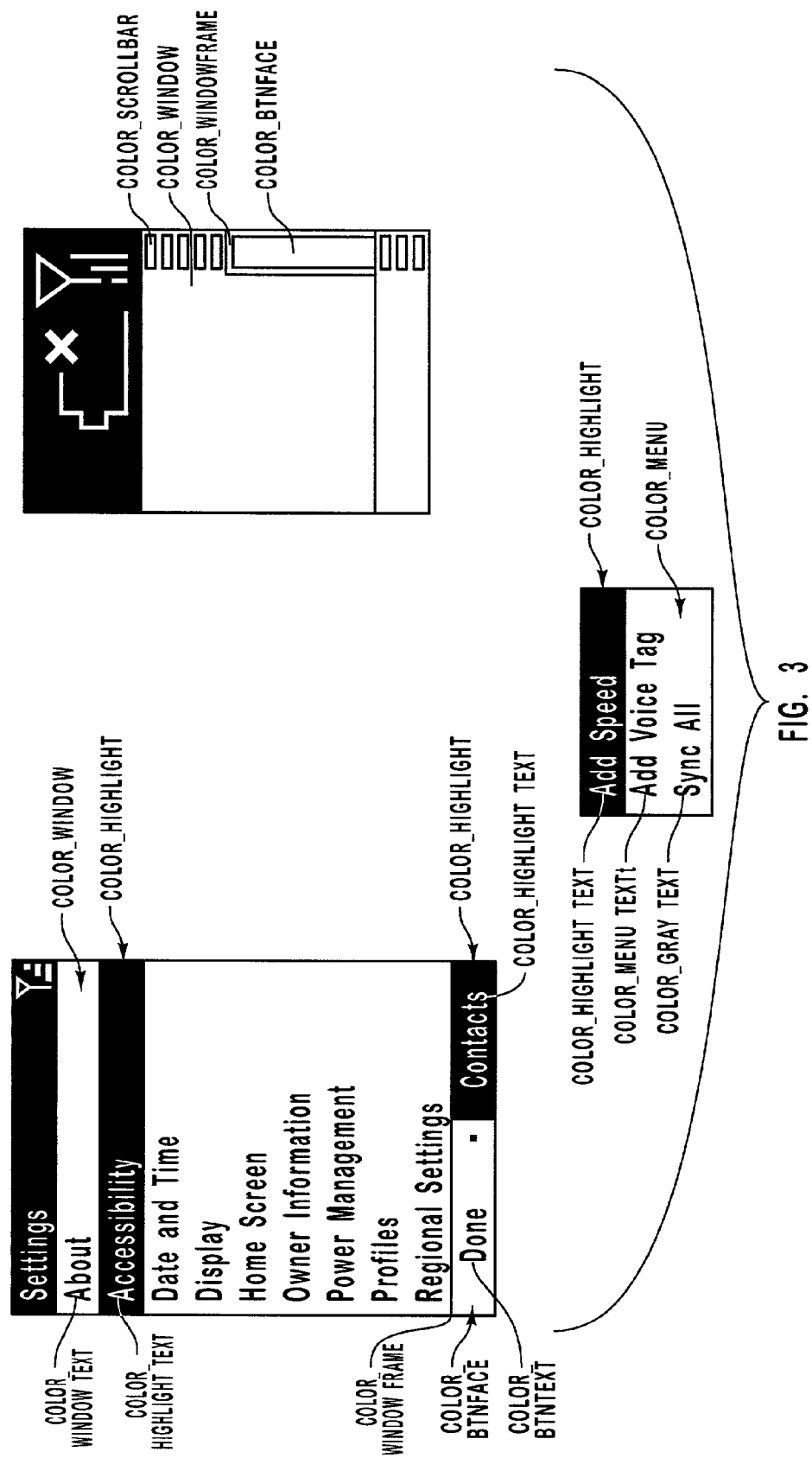
FIG. 3 illustrates different portions of a display that are associated with the colors of a color scheme in accordance with the present invention.

FIG. 3 shows example portions of various displays and which areas of the display are associated with some of the color attributes included in Table 1.

Following color scheme settings, a layout file may include reference to one or more data consuming applications, which receive data and display it on a display such as display 105. One example of a customized tag used to reference data consuming applications is the "plugin" tag. The Leaves file includes the following XML based "plugin" tag to retrieve phone status information and display associated icons.

```
<?xml version="1.0" ?>
<home>
    .
    .
    <plugin file="sysplug.dll" name="iconbar" height="20">
        <iconbar fgcolor="#FFFFFF" />
        <background gradient="title" />
    </plugin>
    .
    .
</home>
```

One method for using a plug-in to retrieve data is to access a Dynamic Link Library ("DLL") file that has included therein one or more plug-ins. A DLL is a library of executable functions or data that may be used by an application. Typically, a DLL provides one or more particular functions and an application accesses the functions by creating a link to the DLL. A DLL may be written for a particular application, such as one that customizes the display of data on a display device, and may be used by several applications at the same time.

The file attribute associated with the "plugin" tag specifies a DLL file that includes the plug-in and the name attribute specifies the name of the plug-in within the DLL. In this case, the "iconbar" plug-in would be included in the "sysplug.dll" DLL. The height attribute associated with the "plug-in" tag specifies the height of the area (in pixels) data retrieved from the plug-in will be displayed in. The fgcolor attribute associated with the "iconbar" tag sets text retrieved by the plug-in to the color white. As illustrated in FIG. 2, the plug-in file generates an icon bar 20 pixels high displaying line selection, battery strength, and signal strength in white.

The Leaves file includes other plug-ins that retrieve data displayed in FIG. 2. The following plug-in is included in the Leaves file to display a static piece of text.

```
<?xml version="1.0" ?>
<home>
    .
    .
    <plugin file="sysplug.dll" name="text" height="40">
        <label>
            <text lang="0x0409">NYI: MRU list</text>
        </label>
    </plugin>
    .
    .
</home>
```

This use of this "plugin" tag calls "sysplug.dll" to access a plug-in named "text", which will be displayed in an area 40 pixels high. The "text" tag specifies the text to display. The "0x0409" value associated with the lang attribute represents that the text in the tag is in English. As shown in FIG. 2 the text "NYI:MRU list" is displayed in an area with a height of 40 pixels. The text is displayed in white because the value of the default fgcolor attribute, the attribute used for text color, was not modified by the plug-in.

The following plug-in included in the Leaves file displays the carrier and time.

```
<?xml version="1.0" ?>
<home>
    .
    .
    <plugin file="sysplug.dll" name="carrier" height="40">
```

```
        <carrier/>
        <clock>
            <time y="17" />
        </clock>
    </plugin>
    .
    .
</home>
```

This use of the "plugin" tag calls "sysplug.dll" to access a plug-in named "carrier", which will display data in an area 40 pixels high. The plug-in retrieves the name of the cellular or digital carrier, which is then displayed by the "carrier" tag. Also included within the plug-in is the "clock" tag, which retrieves time data. The "time" tag, which has an associated attribute y with a value of 17, displays the retrieved time data. The y attribute specifies the starting position on the vertical axis for display of data. So in this case, display of the time data would start 17 pixels above the bottom of the display area as defined by the "plugin" tag, which is 40 pixels. Shown in FIG. 2 is the carrier name "XYZ COMMUNICATIONS" and the time "1:33 PM." Both are displayed in the default color of white.

The following plug-in included in the Leaves file displays appointment information.

```
<?xml version="1.0" ?>
<home>
    .
    .
    <plugin file="sysplug.dll" name="calendar" height="40">
        <subject h="16" />
        <time y="17" />
    </plugin>
    .
    .
</home>
```

This use of the "plugin" tag calls "sysplug.dll" to access a plug-in named "calendar", which will display data in an area 40 pixels high. As shown in FIG. 2, there are "No upcoming appointments." However, had there been a scheduled appointment, it would have been displayed by the "subject" tag. The h attribute associated with the "subject" tag specifies the height of the area used to display retrieved data. In the case where h equals 16 all data displayed by the "subject" tag would fit into an area 16 pixels high. This may result in the data being displayed in a smaller font so that it may all be included. If appointment information is displayed, the "time" tag also displays the time of the appointment. Similar to the time associated with the carrier name, the time associated with the appointment would be displayed 17 pixels above the bottom of the display area as defined by the "plugin" tag, which is 40 pixels. The display of "No upcoming appointments" is displayed in the default color of white.

The following plug-in included in the Leaves file displays the count of unread messages.

```
<?xml version="1.0" ?>
<home>
    .
    .
```

```
    <plugin file="sysplug.dll" name="msgcount" height="20">
        <email>
            <text lang="0x0409">E-mail (%d)</text>
        </email>
        <sms x="70">
            <text lang="0x0409">SMS (%d)</text>
        </sms>
    </plugin>
    .
    .
</home>
```

This use of the "plugin" tag calls "sysplug.dll" to access a plug-in named "msgcount", which will display data in an area 20 pixels high. The msgcount plug-in may receive data including the number of unread e-mail and SMS messages. The "email" tag displays the number of e-mail messages using English as the display language for the text. The (% d) is a used to display a variable, which represents the number of e-mail messages. The "SMS" tag displays the number of SMS messages using English as the display language for the text. The (% d) is a used to display a variable, which represents the number of e-mail messages. The "SMS" tag additionally includes the attribute x which is set to a value of 70. The x attribute specifies the starting position on the horizontal axis where text will be displayed. As shown in FIG. 2, "E-mail (0)" is displayed, and "SMS (0)" is displayed at an offset of 70 pixels.

The following plug-in included in the Leaves file displays messages to display the currently active profile.

```
<?xml version="1.0" ?>
<home>
    .
    .
    <plugin file="sysplug.dll" name="profile" height="20">
        <label>
            <text lang="0x0409">Profile:</text>
        </label>
        <profile x="56" />
    </plugin>
    .
    .
</home>
```

This use of the "plugin" tag calls "sysplug.dll" to access a plug-in named "profile", which will display data in an area 20 pixels high. This plug-in uses the "text" tag to display the text "Profile:" in English. As shown in FIG. 2, the text "Profile:" is displayed in an area with a height of 20 pixels. The "profile" tag is used to display the current profile. The "profile" tag includes the attribute x which equals 56. In this case, the data returned by the profile plug-in is "Normal." As shown in FIG. 2, the text "Normal" is displayed at an offset of 56 pixels.

Also, included in the display of FIG. 2 is an unused portion of the display area and a softkey region. The unused portion of the display area may be used to display information from other plug-ins included in the Leaves file or may simply be left blank. However, even if the Leaves file does not utilize the space, other layout files may still display data in this area of the display. The softkey region is reserved for use by the phone for the selection of menus and other information.

Figure 4:
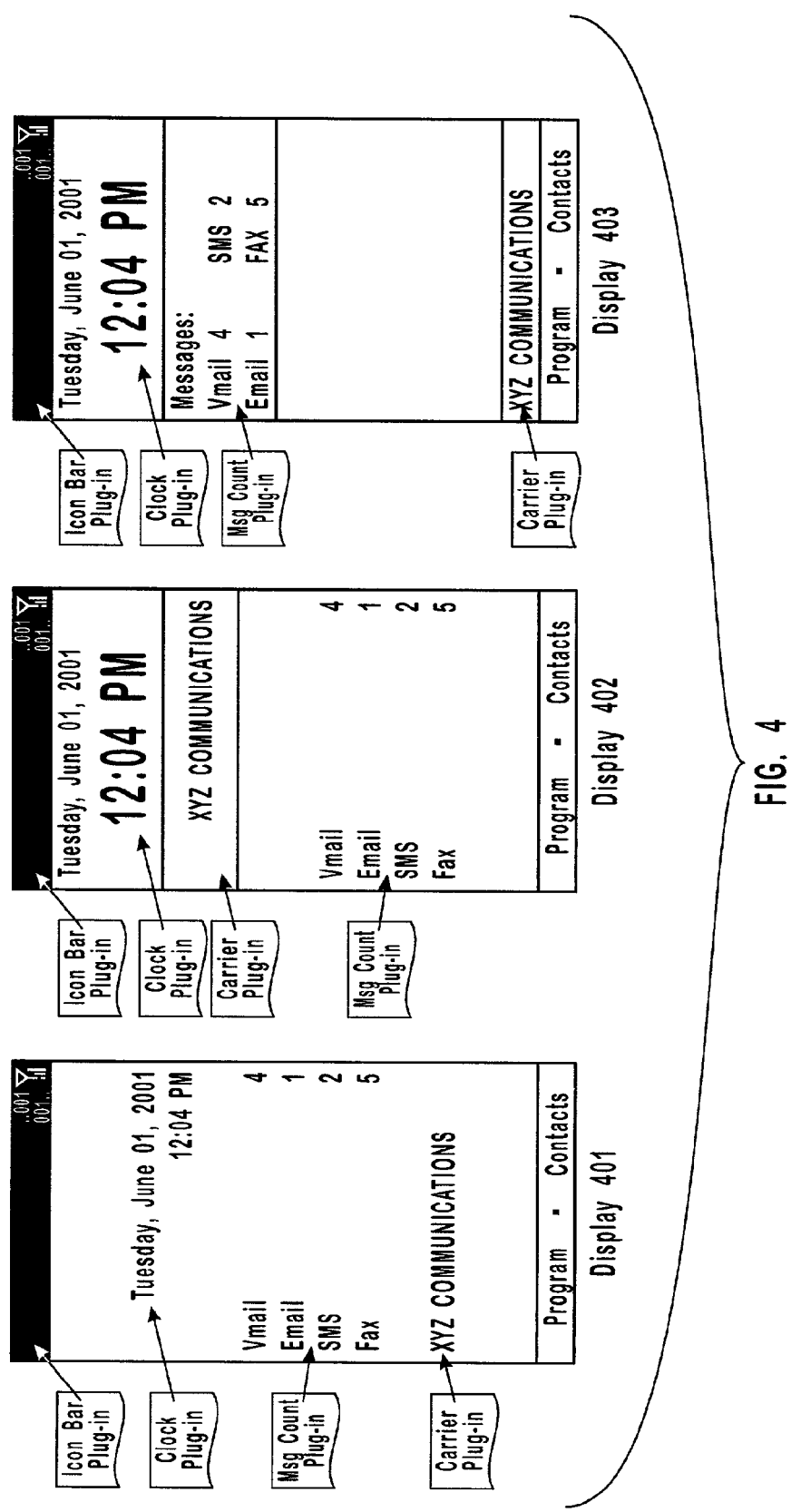
FIG. 4 illustrates the customization of content in different arrangements on a display in accordance with the present invention.

FIG. 4 is illustrative of identical plug-ins using different attributes to format data in different configurations to customize the display. FIG. 4 shows displays 401, 402, and 403 all of which are similar to display 105. Each of the displays includes data from four plug-ins that may be included in a layout file. The four plug-ins were previously described in the discussion of the Leaves file and are the icon bar plug-in, the clock plug-in, the msgcount plug-in, and the carrier plug-in. The clock plug-in displays data in one format on display 401 and in another format on displays 402 and 403. The formats differ because on display 401 the font size is smaller and the data uses a different portion of the display than on displays 402 and 403.

The msgcount plug-in displays data differently on displays 401, 402 and 403. Data is displayed in the same font across all three displays. However, the location and arrangement of the data differs. The data on display 401 is displayed vertically near the middle of the display and the number of messages for each type of message is horizontally offset by a substantial number of pixels. The data on display 402 differs because it is vertically closer to the bottom of the display and the number of messages for each type of message is horizontally offset by a reduced number of pixels. The data on display 403 differs because it is displayed in two columns of two rather than one column of four, it includes the text "messages:" and is associated with a bottom border to separate it from other data on the display.

The carrier plug-in displays data in different locations on displays 401, 402, and 402. Additionally, on display 401, the data is displayed in a small font, with no borders to separate it from other data on the display, and is not horizontal offset. On display 402, the data is displayed in a medium sized font, with a substantial horizontal offset, and includes borders to separate it from other data. On display 403, the data is displayed in a large font, is centered horizontally, and includes borders to separate it from other data.

FIG. 4 is illustrative of only some of the formatting options that may be used to customize the arrangement of similar data on a display. It would be apparent to one skilled in the art, after having reviewed this description, that a wide variety of formatting options may used to implement the principles of the present invention.

Figure 5:
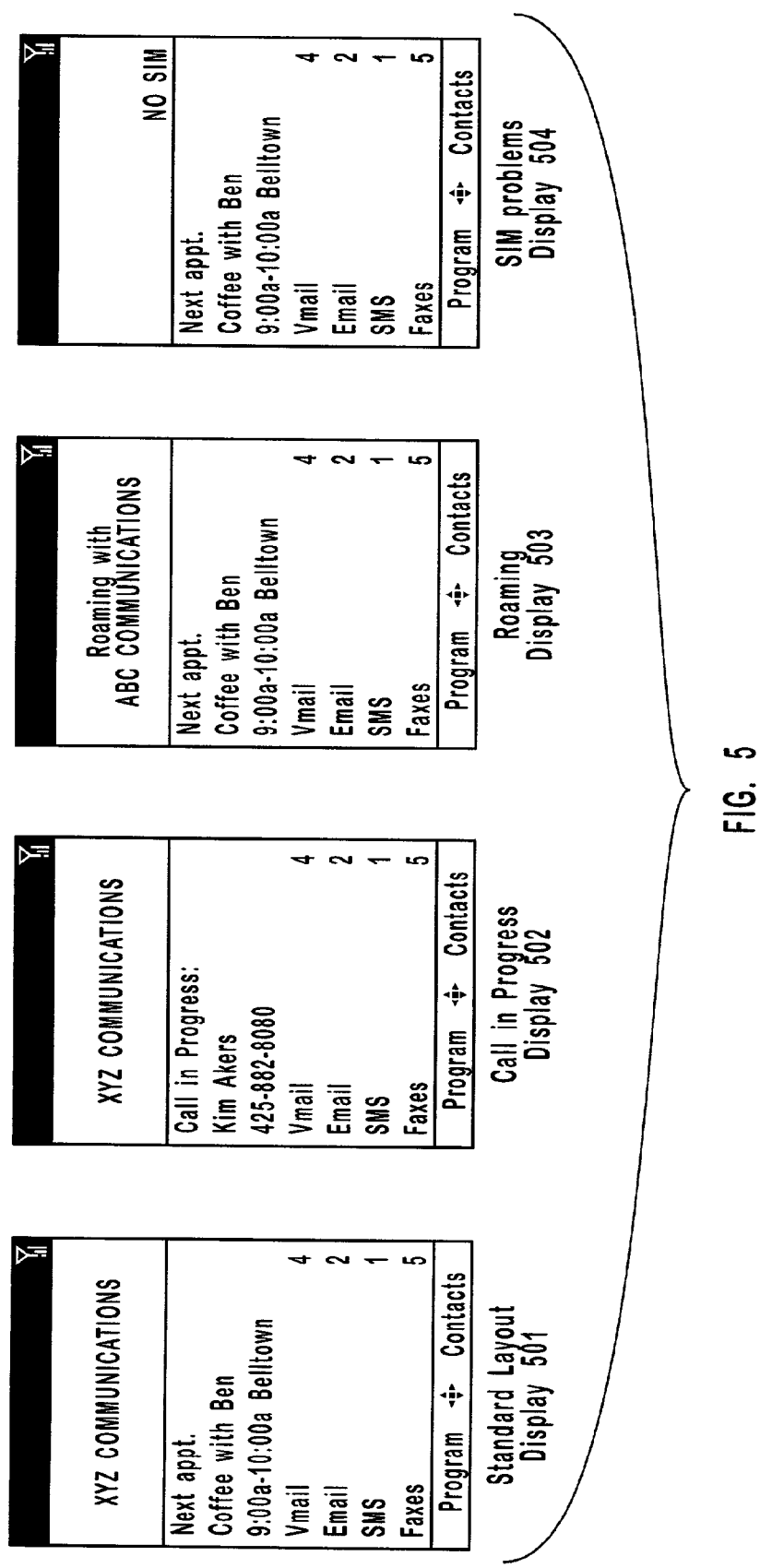
FIG. 5 illustrates the update of content on a display in accordance with the principles of the present invention.

FIG. 5 is illustrative of how a plug-in may update data on a display device. FIG. 5 includes displays 501, 502, 503 and 504, all of which may be displayed on, for example, display 105. Display 501 will be used as a standard layout. Display 501 shows an icon bar, carrier information, appointment information, and message information. If a user of a device, such as telephonic device 100, initiates a call, data associated with the call may be displayed. Shown on display 502 is "Call in progress:" data, which has replaced the appointment information included in display 501. When the call is complete the display may return the appointment information. Thus, one plug-in overrides the data displayed by another plug-in in order to display data a user may be more interested at a particular time.

Shown on display 503 is updated carrier information. If a user of telephonic device 100 were to be geographically outside their calling area, another carrier may provide service. In this instance, the display is updated to show that the carrier has switched from a carrier fictionally named "XYZ communications" to a carrier fictionally named "ABC communications". The display may also update to show malfunctions in telephonic device 100. Shown on display 504 is a description of an error (i.e., "No SIM") in the operation of telephonic device 100.

FIG. 5 is illustrative of only some of the data updates that may be used to customize data on a display; it would be apparent to one skilled in the art, after having reviewed this description, that the principles of the present invention may implement a wide variety of data updates.

Figure 6:
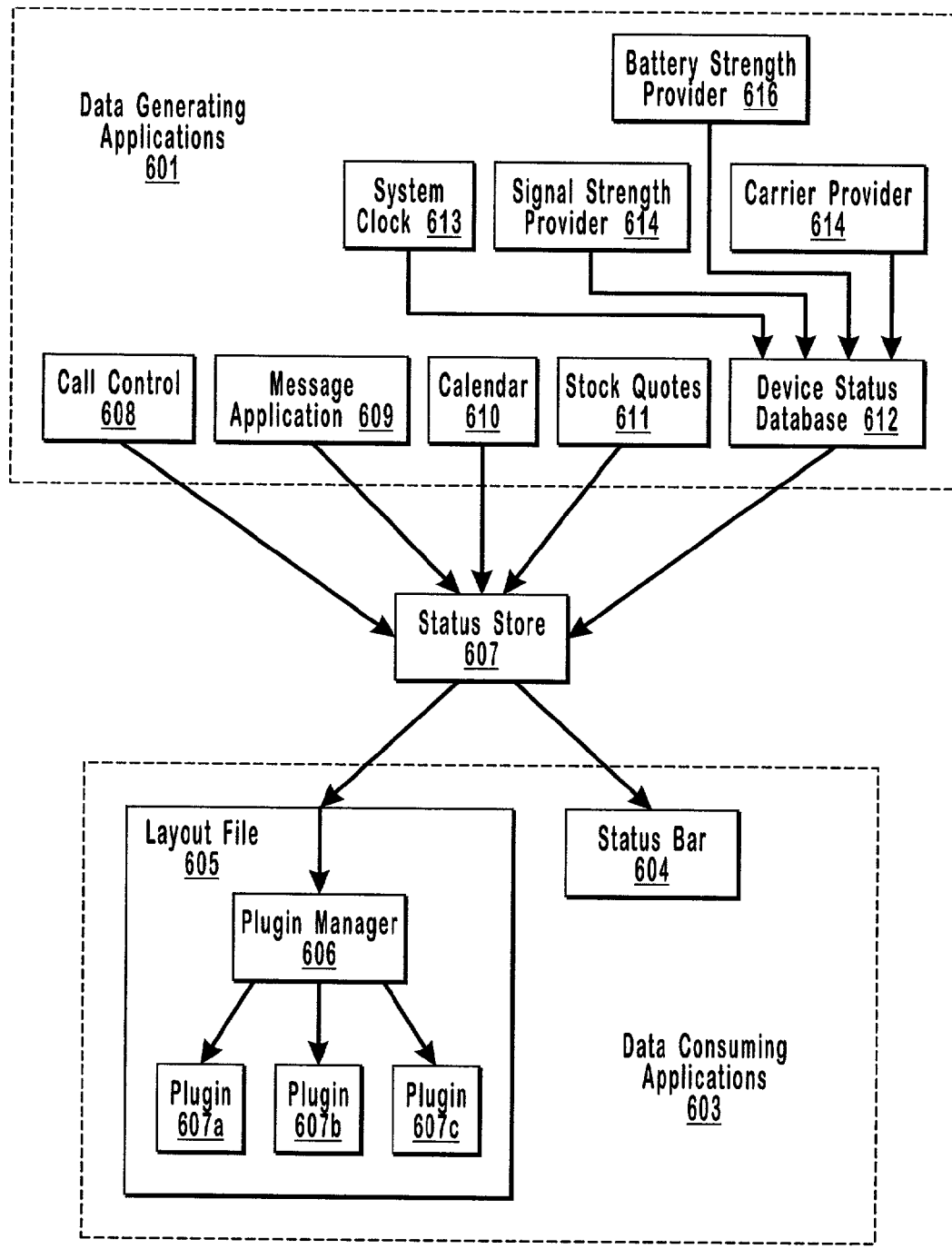
FIG. 6 is a diagram illustrating the functionality between components in which the present invention may be implemented.

FIG. 6 is a functional diagram illustrating an example of how plug-ins, and other data consuming applications may efficiently retrieve data in a manner that conserves the power resources of telephonic device 100. Shown in FIG. 6 are data generating applications 601, status store 602, and data consuming applications 603. Each of these applications may be, for example, one of application programs 114 of FIG. 1. Data generating applications 601 may include call control 608, message application 609, calendar 610, stock quotes 611, and device status database 612. The device status database may receive status updates form system clock 613, signal strength provider 614, carrier provider 615, battery strength provider 616, or the like. Data consuming applications 603 may include status bar 604 and plug-ins 607a, 607b, and 607c, which are associated with layout file 605.

Figure 9:
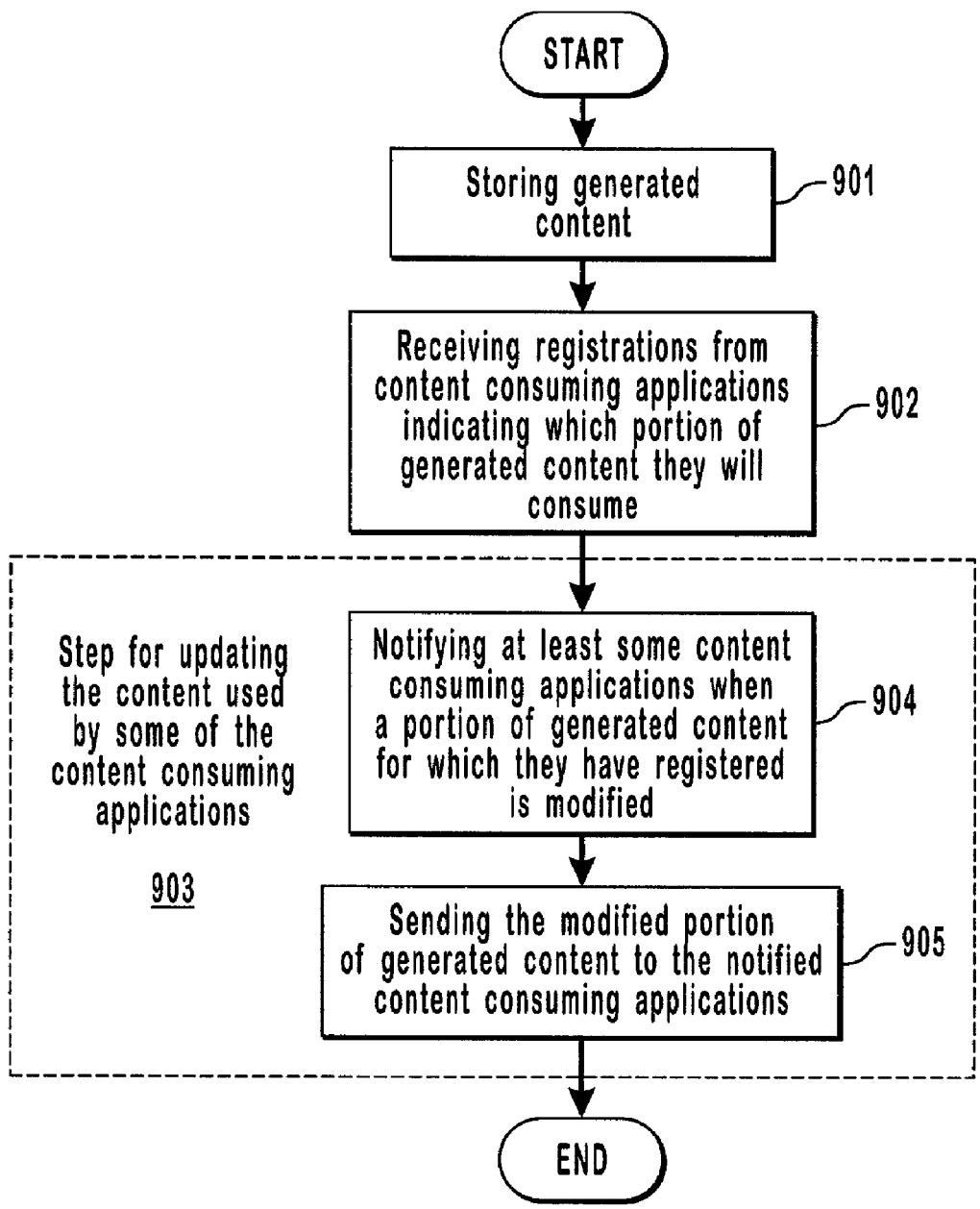
FIG. 9 is a flow chart illustrating a method for content consuming applications to receive updated content in accordance with the present invention.

The operation of FIG. 6 will now be described with respect to FIG. 9, which is a flow chart of a system operation for efficiently displaying data. The method begins with an act of storing generated content (act 901). Status store 602 stores generated content received from one or more of the data generating applications 601.

The method then performs an act of receiving registrations from content consuming applications indicating which portion of generated content they will consume (act 902). This may involve content consuming applications registering with status store 605 indicating which data they will consume. Some data consuming applications may register with status store 605 directly, such as status bar 604, while others register with status store 605 through an intermediary application. In the case of plug-ins, plug-in manager 606 may function as an intermediary between individual plug-ins and status store 605. Plug-in manager 606 receives information from each plug-in indicating what data each plug-in will consume and registers the individual plug-in information with status store 605.

The method then performs a step for updating the content used by some of the content consuming applications (step 903). In one embodiment, this may involve an act of notifying at least some content consuming applications when a portion of generated content for which they have registered is modified (act 904) and sending the modified portion of generated content to the notified content consuming applications (act 904). When status store 602 receives updated content, which one or more data consuming applications have registered for, status store 602 sends notification to the registered data consuming applications. Upon receiving notification, the registered data consuming applications may query status store 602 to attempt to receive the updated content. Status store 602 sends the updated content and after receiving updated content, a data consuming application may update a display to reflect a change in previously displayed content.

In the case of plug-ins, plug-in manager 606 may receive updated content before it is received by an individual plug-in. If the status store notifies plug-in manager 606 of updated content, plug-in manager 606 may, before querying status store 602 to attempt to receive the updated content, initiate a redraw only on the portion of the screen that will be affected by the plug-in that registered for the updated content. Plug-in manager 606 may then query status store 602 to attempt to receive the updated content. Plug-in manager 606 may then send any updated content to the plug-in that registered for the updated content.

In this manner, the data consuming applications only query for updated data when there is updated data available that the data consuming application is interested in. This reduces the processing and memory requirement associated with transferring data updates from the data generating applications to the data consuming applications.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. In a mobile handheld computing device that includes a display device, wherein the mobile handheld computing device is associated with one or more networks, and wherein the display device may receive content from the mobile handheld computing device and from the one or more associated networks, a method for customizing the arrangement of content displayed on the display device so as to allow a user to personalize the displayed content for their specific needs, the method comprising:

creating a layout that defines how content is displayed on the display device of the mobile handheld computing device, by performing the acts of:
defining one or more sections of the layout;
specifying one or more content generating elements from which content may be received for one or more of the defined sections of the layout so as to define where content generated by the content generating elements may be displayed; and
defining attributes associated with content received from the one or more selected content generating elements that cause the appearance of content displayed on the display device of the mobile handheld computing device to be customized.

2. The method as recited in claim 1, wherein creating a layout that defines how content is displayed on the display device of the mobile handheld computing device comprises the following:
an act of using a markup language to create a layout that defines how content is displayed on the display device of the mobile haudheld computing device.

3. The method as recited in claim 2, wherein the act of using a markup language to create a layout that defines how content is displayed on the display device of the mobile handheld computing device comprises the following:
using an XML based markup language to create a layout that defines how content is displayed on the display device of the mobile handheld computing device.

4. The method as recited in claim 1, wherein the act of specifying one or more content generating elements from which content may be received comprises the following:
an act of including one or more plug-ins in a layout file.

5. The method as recited in claim 1, wherein the act of defining attributes associated with content received from the one or more selected content generating elements that cause the appearance of content displayed on the display device of the mobile handheld computing device to be customized comprises the following:
setting attributes associated with content received from one or more tags associated with a markup language that cause the appearance of content displayed on the display device of the mobile handheld computing device to be customized.

6. The method as recited in claim 5, wherein the act of defining attributes associated with content received from one or more tags associated with a markup language that cause the appearance of content displayed on the display device of the mobile handheld computing device to be customized comprises the following:
an act of setting attributes associated with content received from one or more tags associated with an XML based markup language that cause the appearance of content displayed on the display device of the mobile handheld computing device to be customized.

7. The method as recited in claim 1, wherein the act of specifying one or more content generating elements from which content may be received for one or more of the defined sections of the layout so as to define where content generated by the content generating elements may be displayed comprises the following:
an act of associating one or more attributes with one or more markup language based tags specifying a portion of the display device of the mobile handheld computing device where content received from each of the one or more markup language based tags maybe displayed.

8. In a mobile handheld computing device associated with one or more networks, the mobile handheld computing device including a display device and one or more layouts that may render content on the display device, the layouts including one or more attributes, which may be used to customize content before the content is rendered on the display device, and wherein the one or more layouts may receive content from the mobile handheld computing device and from the one or more associated networks, a method for displaying a customized arrangement of content so as to allow a user to personalize the displayed content for their specific needs, the method comprising the acts of:
allowing a user to switch to an individual layout from among the one or more layouts included in the mobile handheld computing device, the individual layout to be used when interfacing with the user;
specifying one or more applications that may generate content for display on the display device of the mobile handheld computing device;
defining attributes for content generated by the one or more applications;
customizing content generated by the one or more applications based on the attributes defined for the content and on information included in the layout; and
rendering the layout to the user on the display device of the mobile handheld computing device.

9. The method as recited in claim 8, wherein the act of allowing a user selection of a layout from among the one or more layouts included in the mobile handheld computing device comprises the following:
an act of receiving from an input user interface a user selection of a layout from among the one or more layouts included in the mobile haudheld computing device.

10. The method as recited in claim 8, wherein the act of specifying one or more applications that may generate content for display on the display device of the mobile handheld computing device comprises the following:
an act of specifying one or more applications included on a network associated with the mobile handheld computing device that may generate content for display on the display device of the mobile handheld computing device.

11. The method as recited in claim 8, wherein the act of defining attributes with content generated by the one or more applications comprises the following:
an act of associating attributes included in markup language based tags with content generated by the one or more applications.

12. The method as recited in claim 11, wherein the act of associating attributes included in markup language based tags with content generated by the one or more applications comprises the following:

an act of associating attributes included in XML based tags with content generated by the one or more applications.

13. The method as recited in claim 8, wherein the act of customizing content generated by the one or more applications based on the attributes defined for the content and on information included in the layout comprises the following:

an act of customizing the content generated by the one or more applications based on attributes included in markup language based tags that are associated with the generated content.

14. The method as recited in claim 13, wherein the act of customizing the content generated by the one or more applications based on attributes included in markup language based tags that are associated with the generated content comprises the following:

an act of customizing the content generated by the one or more applications based on attributes included in XML based tags that are associated with the generated content.

15. The method as recited in claim 8, wherein the act of rendering the layout to the user on the display device of the mobile handheld computing device comprises the following:

an act of rendering only those portions of the layout that are associated with updated content to the user on corresponding portions of the display device of the mobile handheld computing device.

16. In a mobile handheld computing device associated with one or more networks, the mobile handheld computing device including a display device and one or more layouts that may render content on the display device, the layouts including one or more attributes, which may be used to customize content before the content is rendered on the display device, and wherein the one or more layouts may receive content from the mobile handheld computing device and from the one or more associated networks, a method for displaying a customized arrangement of content so as to allow a user to personalize the displayed content for their specific needs, the method comprising:

an act of allowing user selection of a layout from among the one or more layouts included in the mobile handheld computing device, the individual layout to be used when interfacing with the user;

an act of specifying one or more applications that may generate content for display on the display device of the mobile handheld computing device; and a step for displaying content generated by the one or more specified content generating applications after the content has been modified by one or more formatting options so as to customize the display of the content on the display device of the mobile handheld computing device.

17. The method as recited in claim 16, wherein the step for displaying content generated by the one or more specified content generating applications after the content has been modified by one or more formatting options so as to customize the display of the content on the display device of the mobile handheld computing device comprises:

an act of modifying the generated content by rendering the generated content according to formatting options included in the layout.

18. The method as recited in claim 16, wherein the step for displaying content generated by the one or more specified content generating applications after the content has been modified by one or more formatting options so as to customize the display of the content on the display device of the mobile handheld computing device comprises:

an act of displaying content only on portions of the display device associated data consuming applications for which content has been modified.

19. A computer program product for implementing, in a mobile haudheld computing device associated with one or more networks, the mobile handheld computing device including a display device and one or more layouts that may render content on the display device, the layouts including one or more attributes, which may be used to customize content before the content is rendered on the display device, and wherein the one or more layouts may receive content from the mobile haudheld computing device and from the one or more associated networks, a method for displaying a customized arrangement of content so as to allow a user to personalize the displayed content for their specific needs, the computer program product comprising:

a physical storage computer-readable medium carrying computer-executable instructions, that when executed at the client system, cause the mobile handheld computing device to perform the method, including the acts of:

allowing a selection of a layout from among the one or more layouts included in the mobile haudheld computing device;

designating, based on the received selection of a layout, one or more applications that may generate content for display on the display device of the mobile handheld computing device;

defining attributes for content generated by the one or more applications;

customizing content generated by the one or more applications based on the attributes defined for the generated content and on information included in the layout; and rendering the layout on the display device of the mobile handheld computing device.

* * * * *